Oct. 3, 1961  F. BIEDERMANN ET AL  3,002,425
CHROMATIC PHOTOGRAPHIC REPRODUCTION APPARATUS
Filed March 21, 1957  4 Sheets-Sheet 2

INVENTORS.
Friedrich BIEDERMANN – Richard WICK
BY
Michael S. Striker
agt.

United States Patent Office 3,002,425
Patented Oct. 3, 1961

3,002,425
CHROMATIC PHOTOGRAPHIC REPRODUCTION
APPARATUS
Friedrich Biedermann, Unterhaching, near Munich, and Richard Wick, Munich, Germany, assignors to Agfa Aktiengesellschaft, Leverkusen-Bayerwerk, Germany
Filed Mar. 21, 1957, Ser. No. 647,512
Claims priority, application Germany Mar. 24, 1956
10 Claims. (Cl. 88—24)

The present invention relates to photographic apparatus, particularly for making chromatic reproductions of a photographic transparency.

In making a chromatic reproduction, copy material is successively exposed through a negative to at least three primary additive colors each of which forms a primary image of the photographic transparency in the copy material. In order to assure proper color balance in the resulting composite image, it is necessary to control each exposure separately. Due to variations in the density of the photographic transparency as well as the sensitivity of the copy material to different primary colors, it is very difficult to assure correct color balance unless the amount of light falling on the copy material is carefully measured and the length of exposure controlled.

It is a principal object of this invention to provide apparatus for making chromatic reproductions of photographic transparencies.

A further object of the invention is to provide apparatus for control of the exposure of copy material in making chromatic reproductions of a photographic transparency.

A still further object of the invention is to provide apparatus for automatically controlling the time and sequence of a series of primary color exposures in making a chromatic reproduction of a photographic transparency.

A further object of the invention is to provide apparatus which automatically controls the proper color balance of a chromatic reproduction of a photographic transparency.

Yet another object of the invention is to provide apparatus for making suitably enlarged chromatic reproductions of a photographic transparency.

With the foregoing and other objects in view, the present invention resides in monitoring the light striking the copy material upon which an image of the photographic transparency is formed by providing a light-responsive member behind the copy material. Thus, the intensity of the light striking the copy material can be made to control its exposure since the light-responsive member is arranged to change filter elements after exposure of the copy material to one color and to extinguish the light source during changes of the filter elements.

In a preferred embodiment of the invention, a photoelectric element is disposed behind the copy material and is coupled to a suitable driving mechanism through an electrical relay system arranged to automatically change filter elements in proper sequence after termination of the exposure in one color and to extinguish the light source. Alternatively, the filter elements may be manually changed between exposures in which case the photoelectric member may be arranged to extinguish the light-source during the change of filter elements.

Preferably, the filters are changed automatically after the proper amount of light has fallen on the copy material. To this end, the invention provides a control system which is adapted not only to change filter elements between exposures but also to automatically extinguish the light source between exposures and upon completion of the series, to extinguish the light source and terminate the exposure.

In a preferred embodiment of the invention a photoelectric cell is disposed behind the copy material and actuates a mechanism for changing the filters after a correct quantity of light has fallen on the copy material. The control mechanism preferably includes a plurality of apertured discs, one of which constitutes the filter disc, mounted on a common shaft driven by a motor. The apertures in the disc are arranged to coincide with and be aligned with the optical axis of the apparatus and close electrical contacts which perform the respective functions of extinguishing and energizing the light source and actuating the shaft to rotate the various filters in proper position.

By placing the photoelectric member behind the copy material not only is uniformity between exposures assured but suitable enlargement of the photographic contrast can be effected quite readily. Moreover, by placing the photoelectric member behind the copy material, special reflectors which will transmit light can be avoided.

The invention will be described in greater detail with reference to the accompanying drawing but is not limited either in its concept or organization to the specific embodiments about to be described.

Figure 1:
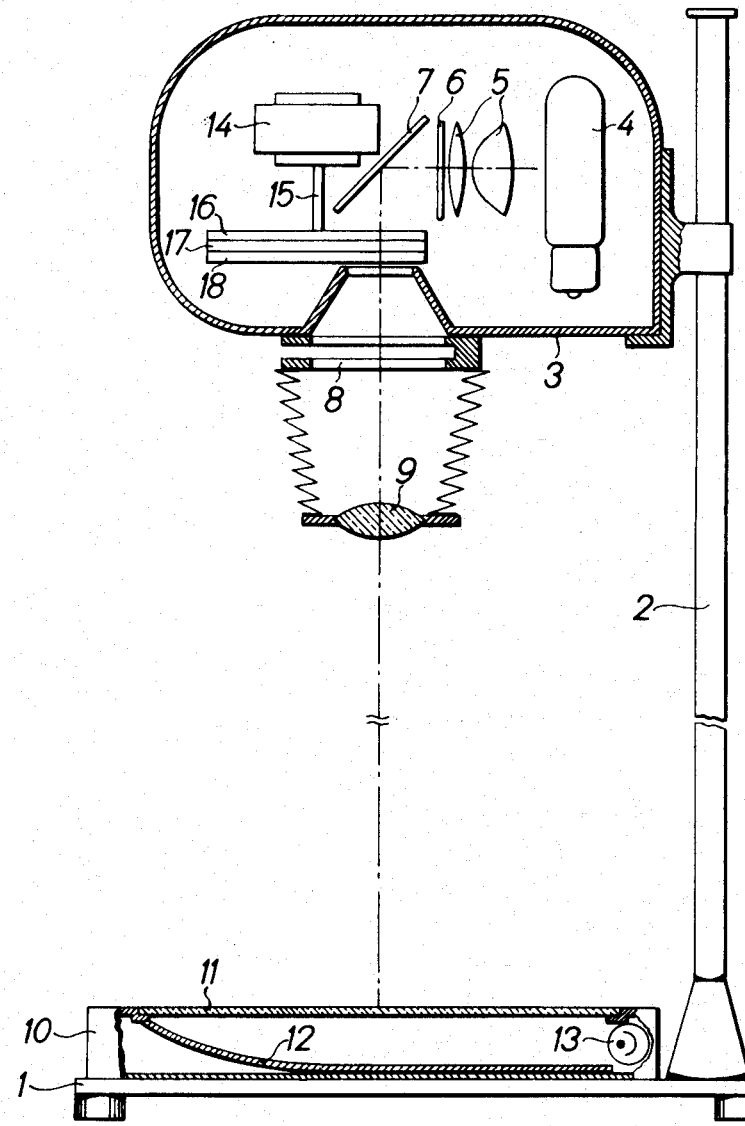
FIG. 1 is an elevational view, in section, of one embodiment of the invention.

In FIG. 1 base 1 supports a stand 2 on which an enlarging head 3 is slideably supported. In the enlarging head there is a lamp 4, a condenser 5, a heat-filter 6, a reflecting mirror 7, a carrier for the photographic transparency (negative) 8 and an objective lens 9. The base includes a frame 10 provided with a light screen 11, a reflector 12, and photocell 13. The reflector directs light passing through the copy material placed on the light screen 11, toward the photocell.

An electric motor 14 is provided in the head, the rotor of which is coupled by a slip-clutch (not shown) so that the rotor can rotate while apertured discs 16, 17 and 18, mounted on shaft 15 can remain stationary. These discs, one of which, 16, carries blue, green and red filters 19, 20 and 21 (FIG. 2), respectively, constitute control members for automatically changing filters, extinguishing and energizing the lamp, and terminating the exposure. Said slip-clutch may be unnecessary when the windings of the motor 14 are formed so that the motor 14 will be not damaged when the rotor is prevented from rotating during the exposure periods.

Figure 4:
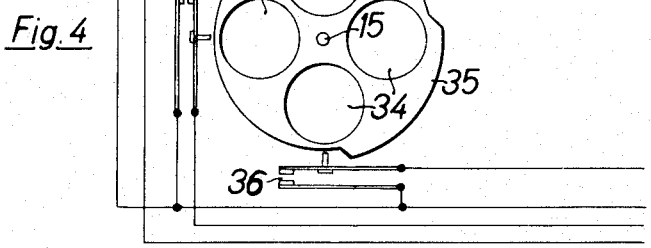

Each of the discs 17 and 18, is provided with a plurality of apertures 29 (FIG. 4) so arranged that apertures of the three discs 16, 17 and 18, are aligned. Disc 16 is further provided with a plurality of projections 24, 25 and 26 each corresponding to a filter and a projection 23 corresponding to an aperture 22 without a filter. These projections are adapted to engage a pawl 28 which prevents rotation of the disc during an exposure in a primary color. Disc 17 is also provided with three cam-like projections 30, 31 and 32 which close contact 33 serving to energize the light source during an exposure when one of the color filters is positioned in the light path. Disc 18 is provided with a single cam-like protuberance 35 adapted to close contacts 36, 37 and 38 when one of the filter elements 19, 20 or 21 respectively are in position for exposure.

Figure 5:
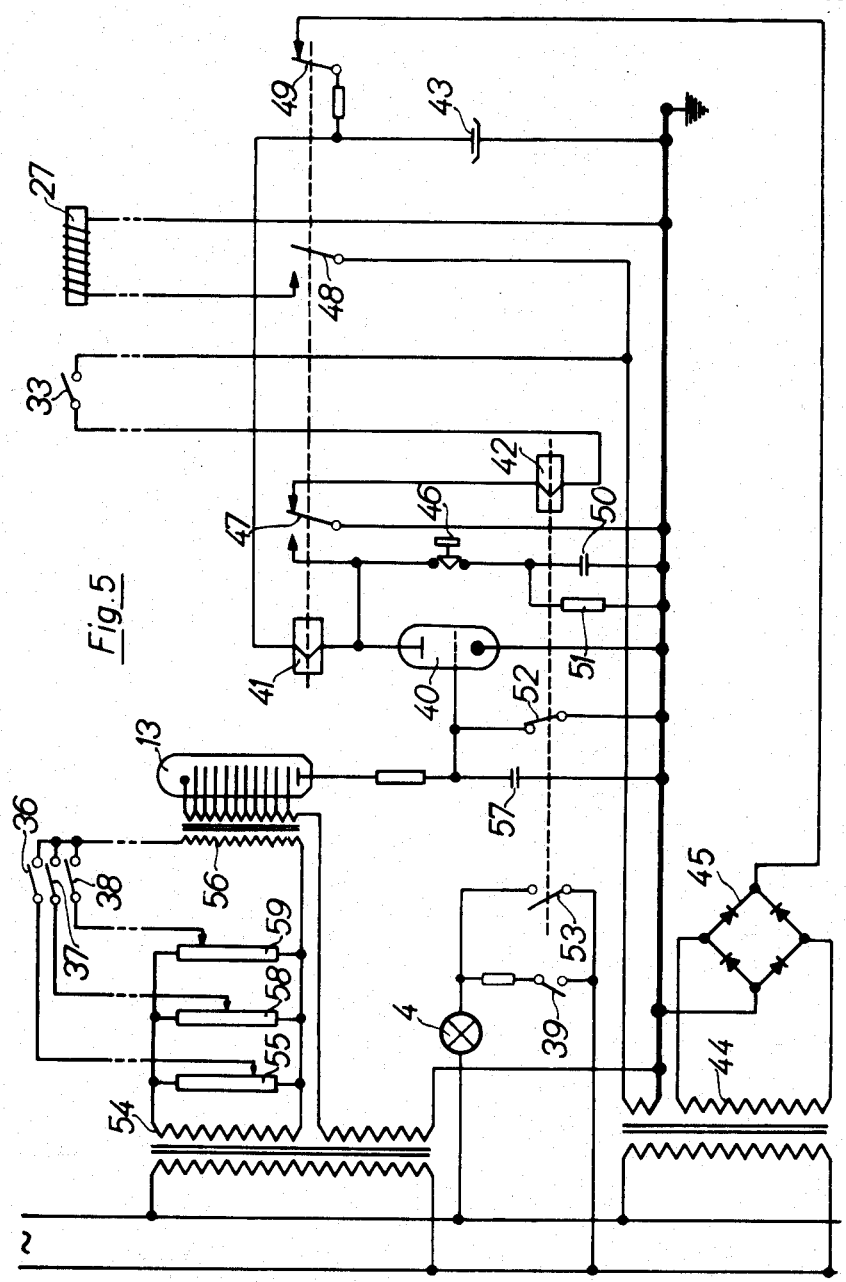
FIG. 5 is a schematic diagram of a relay system for automatically changing filter elements.

While the light filters may be changed manually after each exposure, it is of course desirable to do this automatically. An electrical relay system for performing those functions is illustrated in FIG. 5 including the photoelectric cell 13, which is of the multiplier type, a storage capacitor 57 which is charged during the exposure, an electric tube 40 of the cold cathode-thyratron type, the potential of the grid of said tube is dependent on the voltage of the charged capacitor 57. In the anode circuit of the tube 40 is a relay 41 which operates a contact 47 which serves to actuate a contact in the circuit energizing the light source 4.

Figure 2:
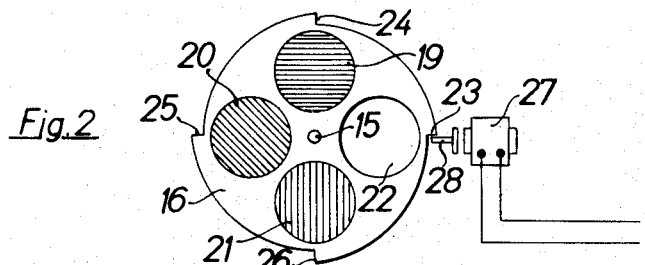
FIGS. 2 to 4 show the elements of an embodiment of the invention for automatically changing color filters.
Figure 3:
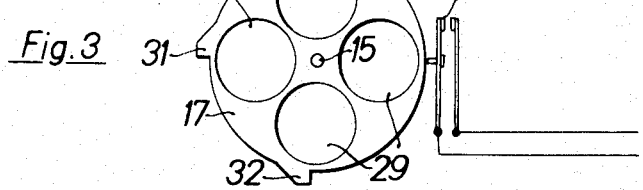

The operation of the circuit shown in FIG. 5 will be best understood with reference to FIGS. 2 and 5. In the positions shown apertures 22, 29 and 34 of discs 16, 17 and 18, respectively, are aligned so that optical axis of the light from lamp 4 passes through the apertures, the photographic transparency and onto the copy material (FIG. 1). Since the thyratron 40 cannot conduct until its grid potential with respect to the cathode exceeds a specified value, relay 41 is non-energized. Consequently, capacitor 43, which is connected to the secondary winding of transformer 44 through the rectifier and contact 49 of relay 41 is at the potential of the secondary winding of the transformer 44.

Switch 39 which closes a circuit energizing lamp 4 is opened and a photographic copy paper is placed upon the screen 11. When switch 46 is closed, relay 41 is energized which reverses contact 47, closes contact 48 and opens contact 49. The opening of contact 49 interrupts the current flowing through relay 41 as soon as capacitor 43 has discharged. Contacts 47, 48 and 49 are consequently returned to their original positions. Capacitor 50, in parallel with a high resistance, suppresses the re-energization of relay 41, if the switch 46 is held closed longer than necessary.

During the short interval that contact 48 remained closed, electro-magnet 27 was energized which attracts pawl 28 (FIG. 2) freeing it of protuberance 23 and allowing disc 16 to rotate 90° until the pawl, which has been released when contact 48 opens, to engage the next protuberance 24, locking disc 16 in position with blue filter 19 in the optical path. Shortly before the termination of the rotation of disc 16, cam-like projection 30 of disc 17, which also rotates since it is mounted on a common shaft, closes contact 33 which energizes relay 42, thus opening contact 52 and closing contact 53, the latter closing the circuit energizing lamp 4, starting the blue exposure.

Further, before the termination of the 90° rotation of the discs 16, 17 and 18, contact 36 is closed by cam-like projection 35 of disc 18 which applies dynode potentials to the electrodes of the photoelectric multiplier tube 13 through potentiometer 55 and the secondary winding of transformer 54 and the primary winding of transformer 56.

Light now passing through the blue filter 19 and apertures 29 and 34 passes through the photographic transparency and forms a blue image on the copy material. Light passing through the copy material is reflected to the photoelectric multiplier causing the latter to conduct and charging capacitor 57. As soon as capacitor 57 has reached the striking potential of the thyratron 40, the latter conducts energizing relay 41 which reverses contact 47, closes contact 48 and opens contact 49. Reversal of contact 47 interrupts current flowing through relay 42 which opens contact 53 and extinguishes the lamp 4 while closing contact 48 causes the pawl 28 to be attracted to the magnet 27 releasing the disc 16 allowing it to rotate 90° where the pawl, which has now been released by the magnet because current flowing through relay 41 has been interrupted, after contact 49 has been opened and condenser 43 has been discharged, engages projection 25. Green filter 20 has now been positioned in the light path.

Similarly, projection 31 of disc 17 which has begun to rotate when disc 16 begins its rotation, closes contact 33 which again energizes relay 42 closing the circuit energizing the lamp; cam 35 of disc 18 has also rotated and closes contact 37 connecting the dynodes of the photomultiplier 13 through potentiometer 58 to the secondary of transformer 54 and the primary of transformer 56.

Light passing through the green filter forms a green image on the copy material whereby light rays transmitting through the copy material and through the viewing screen 11, energize the photo-multiplier 13.

Green light striking the photomultiplier causes the latter to conduct again charging capacitor 57 until the striking potential of the thyratron is reached whereupon the latter conducts energizing relay 41 reversing contact 47, closing contact 48 and opening contact 49.

The reversal of contact 47 interrupts current flowing through relay 42 opening contact 53, and extinguishing the lamp. During the time contact 48 is closed, the pawl is attracted by the magnet 27 which is energized, allowing the discs to rotate 90° until the pawl, which is released by the magnet by the opening of contact 48, engages projection 26. Projection 32 of disc 17 again closes contact 33 energizing relay 42 closing contact 53 energizing lamp 4 and the red filter 21 is in the light path. At the same time rotation of disc 18 has caused cam 35 to close contacts 38 applying dynode potentials to the photomultiplier through potentiometer 59. A red image is now formed on the copy material and red light now energizes the photo-multiplier causing it to conduct, charging capacitor 57 until it reaches the striking potential of the thyratron causing the latter to conduct.

When the thyratron conducts, relay 42 is again energized reversing contact 47, closing contact 48 and opening contact 49. Reversing contact 47 interrupts current flowing through relay 42 opening contact 53 extinguishing lamp 4. Pawl 28 is again attracted by the magnet 27 which has been energized during the closure of contact 48, freeing disc 16 for a 90° rotation. Disc 16 rotates 90° until pawl 28, which has since been released by the magnet, engages projection 23. Disc 17, however, has no corresponding projection and consequently contact 33 cannot close. The lamp consequently remains extinguished. Disc 18 also rotates during this interval but projection 35 closes no contact and consequently the photomultiplier is inactive. The exposure has terminated.

Figure 7:
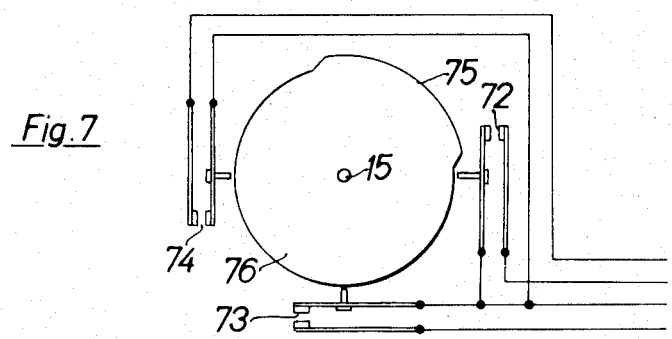
FIG. 7 is a plan view of a control element for changing filters in FIG. 6.
Figure 6:
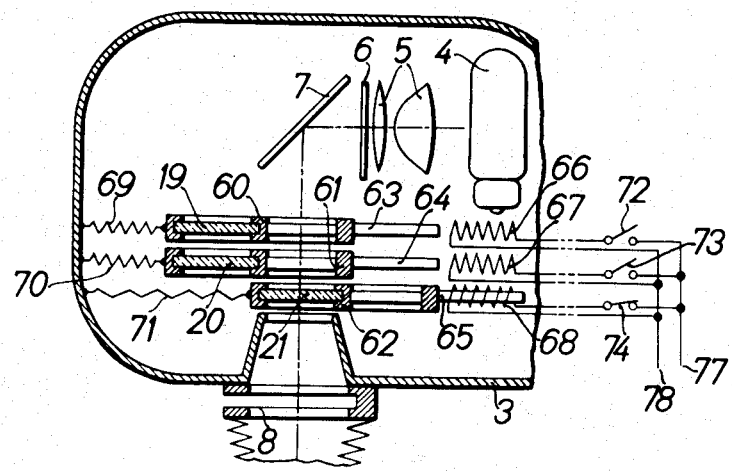
FIG. 6 is another embodiment of the invention.

FIGS. 6 and 7 show another embodiment of the invention in which laterally displaceable filter elements are employed instead of a rotatable filter assembly. In this embodiment the blue, green and red filter elements 19, 20 and 21 are mounted in holders 60, 61 and 62 which are resiliently attached to the inner wall of the enlarging head by means of springs 69, 70 and 71, respectively, and arranged to move laterally into the light path. Each of the supports 60, 61 and 62 are provided with rods 63, 64 and 65 respectively which serve as plungers for solenoids 66, 67 and 68. When one of the solenoids, as for example 68 in FIG. 6, is energized, the corresponding rod is drawn to the right causing the corresponding filter element, 62, to be moved into the light path against the restoring force of the spring 71. Upon the termination of the exposure, the spring returns the filter element to its normal position outside the light path.

In order to automatically control the insertion of the filter elements as in the embodiment described in FIGS. 1–4, a disc 76 is used additionally to the discs 16, 17 and 18, and is also arranged on the axis 15 of the motor 14 (FIG. 1). In that case motor 14 and discs 16, 17, 18, and 76 may be arranged outside the enlarger head 3, and no apertures and filters are to be provided at said discs.

Disc 76 is similar to disc 18 (FIG. 4) in that it has a cam-like projection 75 which, as it rotates together with discs 16, 17, and 18, closes contacts 72, 73 and 74 energizing solenoids 66, 67 and 68. In operation, the disc 76 is rotated until contact 72 is closed which energizes solenoid 66 placing blue filter 19 in the light path. Discs 16, 17 and 18, mounted on the same shaft perform the same functions as in the other embodiment and the operation of the device becomes fully automatic.

Obviously other embodiments and variations of the invention will be apparent to those skilled in the art without departing from the spirit and scope of the invention.

More specifically, it should be readily apparent to those skilled in this art, for instance, that potentiometers 55, 58 and 59 adapted to be adjusted corresponding to the sensitivity of the printing material to light of the different colors and adapted to be adjusted for varying the distribution of the primary colors in the copy, could be placed in the cathode circuit of the thyratron 40. Similarly, for adjusting the sensitivity of the exposure controlling device to light of the primary colors, instead of potentiometers, adjustable capacitors may be provided and arranged instead of capacitor 57, each capacitor corresponding to a given color exposure, and each having a capacity sufficient to permit a satisfactory exposure in color.

Further for the operation of each of the contacts 36, 37, 38, 72, 73 and 74 may be provided separate discs instead of discs 18, 76, each of said separate discs having a cam-like projection for controlling the corresponding contact.

Consequently, we wish it to be clearly understood that the invention is not limited by the embodiments disclosed but is defined by the claims appended below.

What is claimed is:

1. Apparatus for making a copy of a photographic transparency comprising, in combination, a light source, means to support the photographic transparency in the path of light from said source, a support for a photographic copy material in the path of the light passing through said photographic transparency, a chromatic filter comprising three filter elements corresponding to three additive primary colors, means to dispose one of said filters between the light source and the transparency and to energize the light source during the exposure including a first disc having at least three cam-like projections three of which correspond to said filter elements, pawl means normally engaging one of said projections and clearing the same only when retracted, a second disc having three cam-like projections each corresponding to one of said filter elements and adapted to close an electrical contact energizing said light source when one of said filter elements is positioned between the light source and the transparency, a driving member for rotating the discs only when the pawl disengages the projection on said first disc, photoelectric means disposed on the side of the photographic copy material remote from the light source, and electro-responsive means coupled to said photoelectric means for retracting said pawl in engagement with the projection on the first disc and causing thereby the driving member to rotate said discs upon termination of the exposure of the copy material to the color component passing through the filter element whereby the disc is rotated and another filter element interposed between the light source and the transparency said electro-responsive means automatically terminating illumination of the transparency by said light source after a predetermined amount of light has passed therethrough and impinged upon said photo-electric means and discontinuing said illumination during rotation of said first disc.

2. Apparatus for making a copy of a photographic transparency comprising, in combination, a light source, means to support the photographic transparency in the path of light from said source, a support for a photographic copy material in the path of the light passing through said photographic transparency, a chromatic filter comprising three filter elements corresponding to three additive primary colors, means to dispose one of said filter elements between the light source and the transparency including driving means, a first disc coupled to said driving means having at least three cam-like projections three of which correspond to said filter elements, pawl means normally engaging one of said projections and clearing the same when retracted, means to retract the pawl means to allow the same to clear one projection and engage a succeeding projection, a second disc coupled to said driving means and having three cam-like projections each corresponding to one of said filter elements and adapted to close an electrical contact energizing the light source when said filter element is between the light source and the transparency, a photoelectric device disposed in the path of the light of said light source after the same has passed through said transparency, a third disc coupled to said driving means and having a cam-like projection adapted to close one of a set of three contacts each corresponding to one of said filter elements thereby energizing said photoelectric means, electrical means responsive to current flowing through said photoelectric device for energizing said pawl actuating means to thereby position one of said filter elements between the light source and the transparency, energize the light source and energize the photoelectric device said electrical means automatically terminating illumination of the transparency by said light source after a predetermined amount of light has passed therethrough and impinged upon said photo-electric device and discontinuing said illumination during movement of said discs.

3. Apparatus for making a copy of a photographic transparency comprising, in combination, a light source, means to support the photographic transparency in the path of light from said source, a support for a photographic copy material in the path of the light passing through said photographic transparency, a chromatic filter comprising three filter elements corresponding to three additive primary colors, means to dispose one of said filter elements between the light source and the transparency including driving means, a first disc coupled to said driving means having a cam-like projection adapted upon rotation to close sequentially a series of three contacts each of which corresponds to one of said filter elements, electro-mechanical means responsive upon closure of one of said contacts to dispose one of said filter elements between the light-source and the transparency and upon opening of said contact to displace the filter element to a position outside the light-path, a second disc having a plurality of cam-like projections each corresponding to one of said filter elements and adapted to close in sequence an electrical contact for energizing the light source when said filter element is positioned between the light source and the transparency, a photoelectric device disposed in the path of the light of said light source after the same has passed through said transparency, a third disc having a cam-like projection adapted to close one of a set of three contacts each corresponding to one of said filter elements to energize the photoelectric device when said filter element is positioned between the light source and the transparency, electrical means responsive to current flowing through the photoelectric device to actuate said driving means thereby rotating said discs upon completion of one exposure, extinguishing the light source and the photoelectric device during a change of filter elements, and reenergizing the light source and the photoelectric device when another filter is positioned between the light source and the transparency said electrical means automatically terminating illumination of the transparency by said light source after a predetermined amount of light has passed therethrough and impinged upon said photo-electric device and discontinuing said illumination during movement of said discs.

4. Apparatus for making a copy of a photographic transparency comprising, in combination, a light source, means to support the photographic transparency in the path of light from said source, a support for a photographic copy material in the path of the light passing through said photographic transparency, a chromatic filter comprising three filter elements corresponding to three additive primary colors, means to dispose one of said filter elements between the light source and the transparency including driving means, a first disc coupled to said driving means having at least three cam-like projections three of which correspond to said filter elements, pawl means normally engaging one of said projections and clearing the same when retracted, means to retract the pawl means to allow the same to clear one projection and engage a succeeding projection, a second disc coupled to said driving means and having three cam-like projections each corresponding to one of said filter elements and adapted to close an electrical contact energizing the light source when said filter element is between the light source and the transparency, a photoelectric device disposed in the path of the light of said light source after the same has passed through said transparency, a third disc coupled to said driving means and having a cam-like projection adapted to close one of a set of three contacts each corresponding to one of said filter elements thereby energizing said photoelectric means, said discs being disposed between the light source and the transparency and each having four apertures, the apertures in the respective discs being aligned so that the optical axis coincides with the light path, said first disc supporting the filter elements in three of the apertures and upon rotation thereof disposes a filter element between the transparency and the light source, electrical means responsive to current flowing through said photoelectric device for energizing said pawl actuating means to thereby position one of said filter elements between the light source and the transparency, energize the light source and energize the photoelectric device said electrical means automatically terminating illumination of the transparency by said light source after a predetermined amount of light has passed therethrough and impinged upon said photoelectric device and discontinuing said illumination during movement of said discs.

5. Apparatus for making a copy of a photographic transparency comprising, in combination, a light source, means to support the photographic transparency in the path of light from said source, a support for a photographic copy material in the path of the light passing through said photographic transparency, a chromatic filter comprising three filter elements corresponding to three additive primary colors, means to dispose one of said filter elements between the light source and the transparency including driving means, a first disc coupled to said driving means having a cam-like projection adapted upon rotation to close sequentially a series of three contacts each of which corresponds to one of said filter elements, three solenoid members each coupled to one of said filter elements and upon closure of one of said contacts to dispose one of said filter elements between the light-source and the transparency and upon opening of said contact to displace the filter element to a position outside the light-path, a second disc having a plurality of cam-like projections each corresponding to one of said filter elements and adapted to close in sequence an electrical contact for energizing the light source when said filter element is positioned between the light source and the transparency, a photoelectric device disposed in the path of the light of said light source after the same has passed through said transparency, a third disc having a cam-like projection adapted to close one of a set of three contacts each corresponding to one of said filter elements to energize the photoelectric device when said filter element is positioned between the light source and the transparency, electrical means responsive to current flowing through the photoelectric device to actuate said driving means thereby rotating said discs upon completion of one exposure, extinguishing the light source and deenergizing the photoelectric device during a change of filter elements, and reenergizing the light source and the photoelectric device when another filter is positioned between the light source and the transparency said electrical means automatically terminating illumination of the transparency by said light source after a predetermined amount of light has passed therethrough and impinged upon said photo-electric device and discontinuing said illumination during movement of said discs.

6. Apparatus for making a copy of a photographic transparency comprising, in combination, a light source, means to support the photographic transparency in the path of light from said source, a support for a photographic copy material in the path of the light passing through said photographic transparency, a chromatic filter comprising three filter elements corresponding to three additive primary colors, means to dispose one of said filter elements between the light source and the transparency including driving means, a first disc coupled to said driving means having at least three cam-like projections three of which correspond to said filter elements, pawl means normally engaging one of said projections and clearing the same when retracted, means to retract the pawl means to allow the same to clear one projection and engage a succeeding projection, a second disc coupled to said driving means and having three cam-like projections each corresponding to one of said filter elements and adapted to close an electrical contact energizing the light source when said filter element is between the light source and the transparency, a photoelectric multiplier device disposed in the path of the light of said light source after the same has passed through said transparency, a third disc coupled to said driving means and having a cam-like projection adapted to close one of a set of three contacts each corresponding to one of said filter elements thereby energizing said photoelectric means, said discs being disposed between the light source and the transparency and each having four apertures, the apertures in the respective discs being aligned so that the optical axis coincides with the light path, said first disc supporting the filter elements in three of the apertures and upon rotation thereof disposes a filter element between the transparency and the light source, capacitor means coupled to said photoelectric multiplier device, an electron discharge tube responsive to the potential of said capacitor and adapted to conduct at a predetermined potential, and relay means adapted to be energized when said electron tube conducts for energizing said pawl actuating means to thereby position one of said filter elements between the light source and the transparency, energize the light source and energize the photoelectric device.

7. Apparatus for making a copy of a photographic transparency comprising, in combination, a light source, means to support the photographic transparency in the path of light from said source, a support for a photographic copy material in the path of the light passing through said photographic transparency, a chromatic filter comprising three filter elements corresponding to three additive primary colors, means to dispose one of said filter elements between the light source and the transparency including driving means, a first disc coupled to said driving means having a cam-like projection adapted upon rotation to close sequentially a series of three contacts each of which corresponds to one of said filter elements, three solenoid members each coupled to one of said filter elements and upon closure of one of said contacts to dispose one of said filter elements between the light-source and the transparency and upon opening of said contact to displace the filter element to a position outside the light-path, a second disc having a plurality of cam-like projections each corresponding to one of said filter elements and adapted to close in sequence an electrical contact for energizing the light source when said filter element is positioned between the light source and the transparency, a photoelectric device disposed in the path of the light of said light source after the same has passed through said transparency, a third disc having a cam-like projection adapted to close one of a set of three contacts each corresponding to one of said filter elements to energize the photoelectric device when said filter element is positioned between the light source and the transparency, capacitor means coupled to said photoelectric multiplier device, an electron discharge tube responsive to the potential of said capacitor and adapted to conduct at a predetermined potential, and relay means adapted to be energized when said electron tube conducts to actuate said driving means thereby rotating said discs upon completion of one exposure, extinguishing the light source and the photoelectric device during a change of filter elements, and reenergizing the light source and the photoelectric device when another filter is positioned between the light source and the transparency.

8. Apparatus for making color copies of photographic color transparencies upon light-sensitive pirnting material comprising, in combination, a support for said light-sensitive printing material, illuminating means for consecutively illuminating light sensitive printing material on said support with light of three primary colors, a support for a photographic color transparency for supporting the same in the path of the illuminating light between said illuminating means and said light-sensitive printing material, changing means associated with said illuminating means for changing the color of said illuminating light from one of said primary colors to another in predetermined sequence, photoelectric means arranged in the path of light from the illuminating means after the same has passed through said transparency and being, during the entire time of each of said consecutive exposures of the printing material, exposed to and influenced by said light of one of said three primary colors, exposure time regulating means associated with said photoelectric means for automatically regulating the duration of each of said consecutive exposures corresponding to the amount of illumination of said photoelectric means during each exposure, and switching means controlled by said exposure time regulating means for automatically actuating said changing means at the end of each exposure to change the color of the illuminating light from one to another of said primary colors and to restart illumination of the printing material after the color of the illuminating means has been changed.

9. An apparatus as defined in claim 2 in which said three discs are mounted for simultaneous rotation on a common shaft.

10. Apparatus for making color copies of photographic color transparencies upon light-sensitive printing material comprising, in combination, illuminating means, a support for said photographic color transparency in the path of light from said illuminating means, a support for said light-sensitive printing material in the path of the light passing through said photographic color transparency, a chromatic light filter interposed between said illuminating means and said transparency and including three filter elements each of which corresponds to a primary additive color component of said illuminating means, changing means to selectively interpose each of said filter elements sequentially between said illuminating means and the transparency, photo-electric means arranged in the path of light from said illuminating means after the light has passed through said transparency, said photo-electric means being during the entire time of each of said consecutive exposures of said printing material exposed to and influenced by light of one of said three primary colors, exposure time regulating means associated with said photo-electric means for automatically regulating the duration of each of said consecutive exposures corresponding to the amount of illumination of said photo-electric means during each exposure and for terminating each of said exposures after a pre-determined amount of light has impinged on said photo-electric means, three adjustable color-correction means adapted to be alternatively placed in circuit with said photo-electric means for varying the pre-determined amount of light which has to impinge upon said photo-electric means to terminate each exposure, and switching means for automatically actuating said changing means at the end of each exposure so as to change the color of the illuminating light from one to another of said primary colors by changing said filter elements, to automatically place with the change of said filter elements the corresponding color-correction means in circuit with said photo-electric means and to restart illumination of the printing material thereafter.

References Cited in the file of this patent
UNITED STATES PATENTS

| | | |
|---|---|---|
| 2,480,422 | Simmon et al. | Aug. 30, 1949 |
| 2,484,299 | Labrum | Oct. 11, 1949 |
| 2,500,049 | Williams | Mar. 7, 1950 |
| 2,518,947 | Simmon | Aug. 15, 1950 |
| 2,566,264 | Tuttle et al. | Aug. 28, 1951 |
| 2,691,917 | Curry | Oct. 19, 1954 |
| 2,764,060 | Horak | Sept. 25, 1956 |
| 2,847,903 | Modney | Aug. 19, 1958 |

FOREIGN PATENTS

| | | |
|---|---|---|
| 737,972 | Great Britain | Oct. 5, 1955 |
| 1,110,123 | France | Oct. 5, 1955 |